Dec. 29, 1936.    M. MAUL    2,065,864
TRANSLATOR DEVICE FOR HOLE COMBINATIONS
Filed Sept. 21, 1931    4 Sheets—Sheet 1
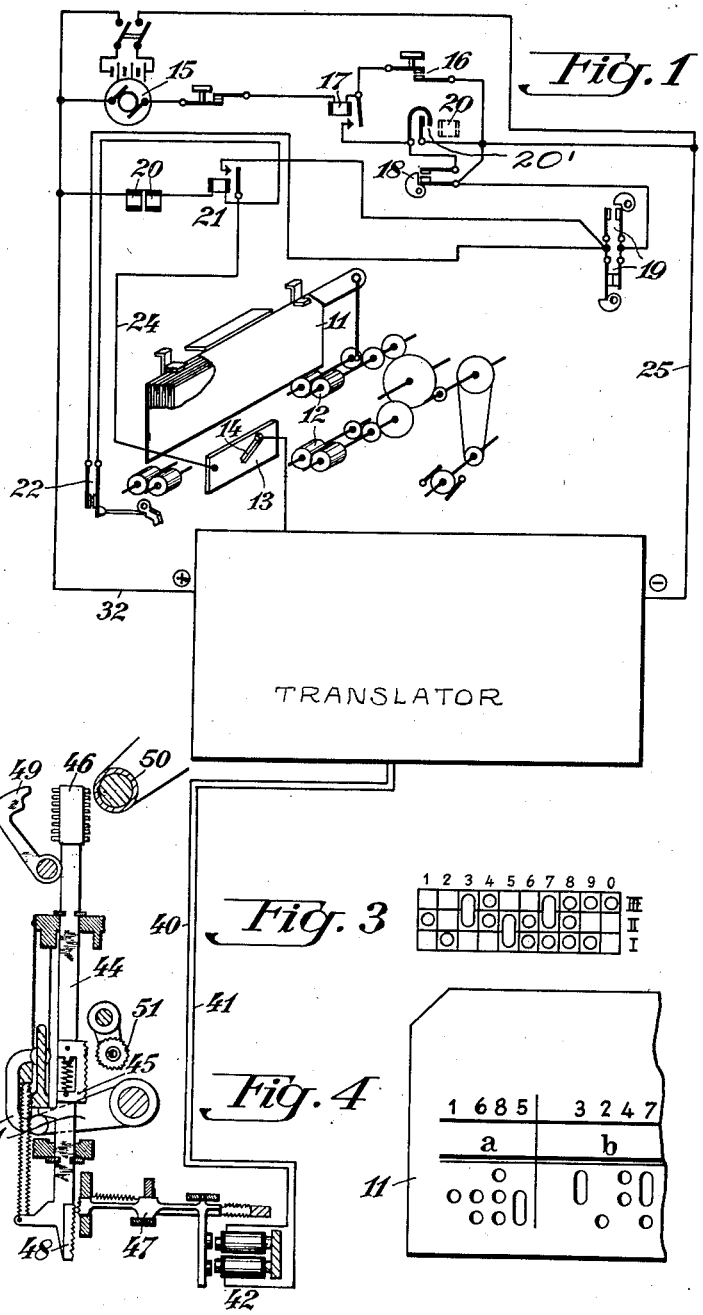
Inventor:
Michael Maul Dec. 29, 1936.  M. MAUL  2,065,864
TRANSLATOR DEVICE FOR HOLE COMBINATIONS
Filed Sept. 21, 1931  4 Sheets-Sheet 2
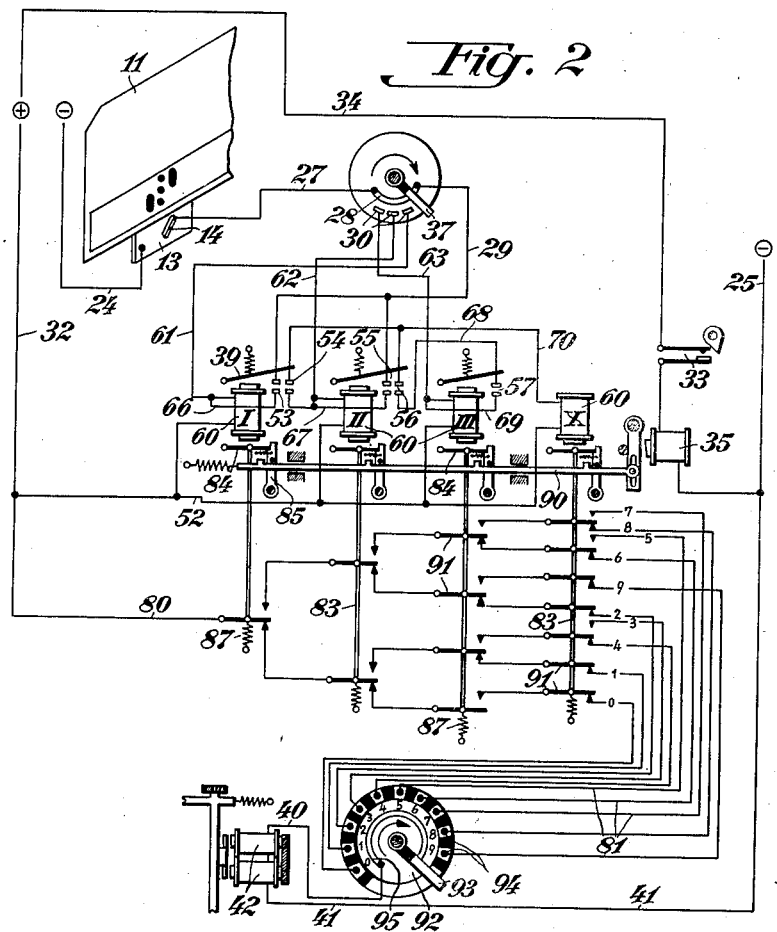
Inventor:
Michael Maul Dec. 29, 1936. M. MAUL 2,065,864
TRANSLATOR DEVICE FOR HOLE COMBINATIONS
Filed Sept. 21, 1931 4 Sheets-Sheet 3
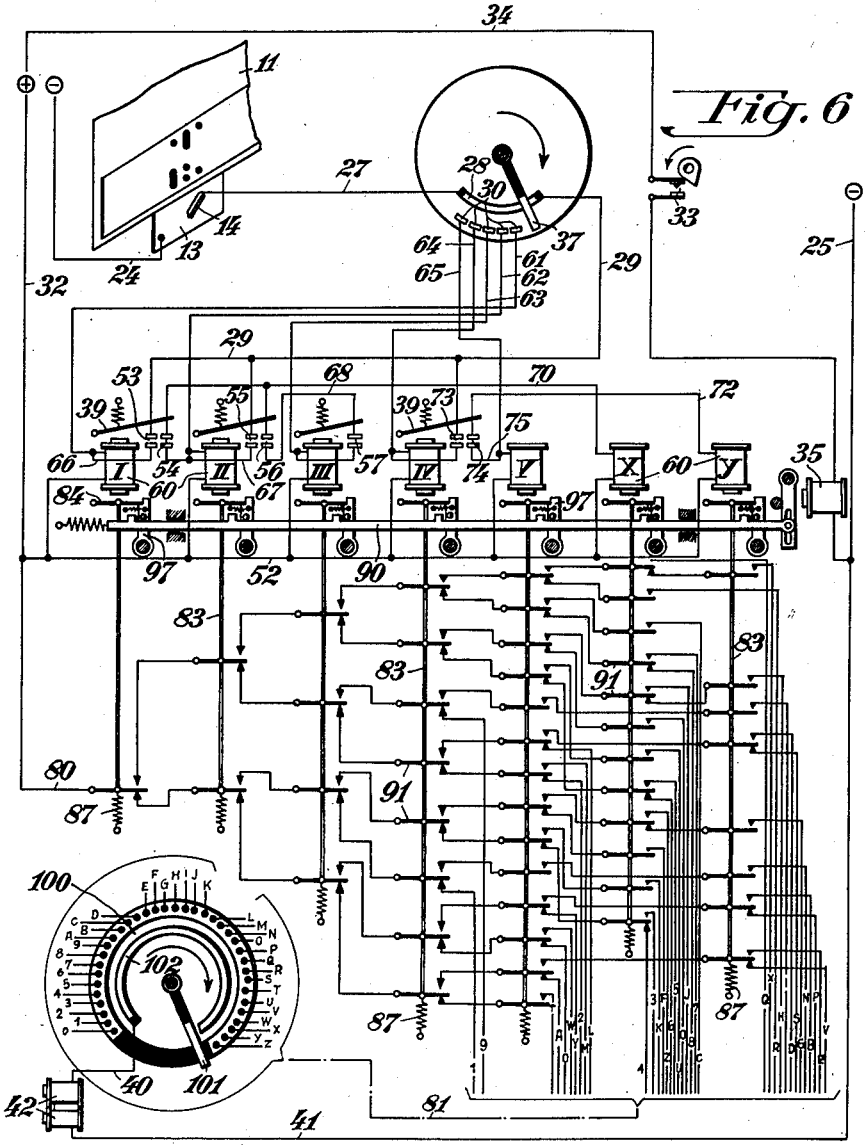

Dec. 29, 1936.    M. MAUL    2,065,864
TRANSLATOR DEVICE FOR HOLE COMBINATIONS
Filed Sept. 21, 1931    4 Sheets-Sheet 4
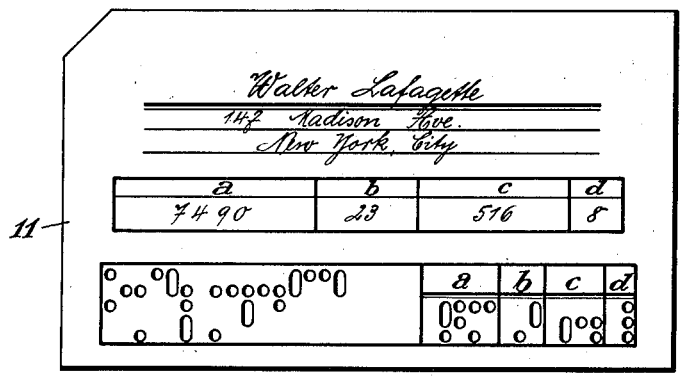
Fig. 7
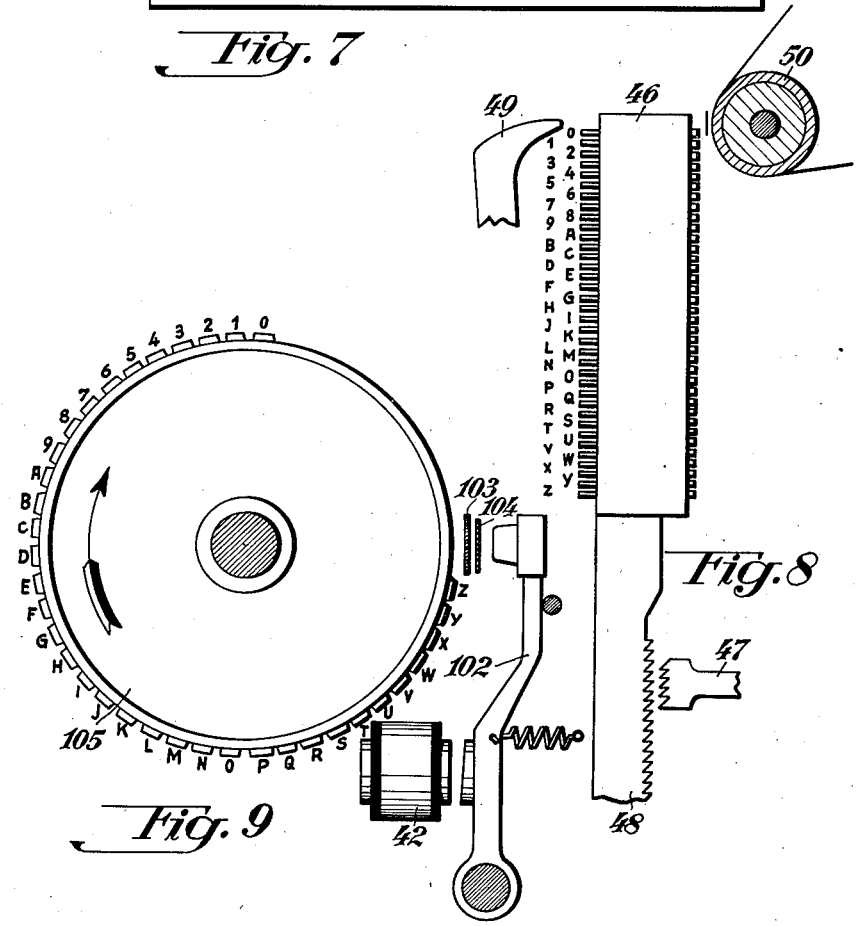
Fig. 8
Fig. 9
Inventor:

Patented Dec. 29, 1936

2,065,864

UNITED STATES PATENT OFFICE 2,065,864

TRANSLATOR DEVICE FOR HOLE COMBINATIONS

Michael Maul, Berlin-Johannisthal, Germany

Application September 21, 1931, Serial No. 564,172
In Germany September 22, 1930

1 Claim. (Cl. 235—92)

The present invention relates to a novel method of controlling machinery by means of particular hole combinations, and to a novel translator mechanism being adapted to translate distinct hole combinations into single characters corresponding to the meaning of said particular hole combinations. In the translator for hole combinations of the kind herein described, provision is made to analyze the hole combinations by means of an electrical or mechanical analyzing mechanism and to translate the result of the analysis by means of the translator into a single controlling character, either in the form of the selection of one of a plurality of controlling members or by the time differential release of a controlling impulse, and said single characters are in turn adapted to control certain different controlling operations in machinery.

Control of machinery by means of hole combinations is well known in the art; so for instance, hole combinations are used for the control of sorting and tabulating machines by means of perforated record cards, for the control of automatic typewriters and telegraphs, and in many other instances. Accordingly the present invention which relates to novel hole combinations and novel means controlled thereby may also be used in connection with any machine which is to be differentially controlled by the novel hole combinations still to be described.

According to the present invention controlling of machines is effected by means of hole combinations comprising "single-positional holes" and "plural-positional holes" as well as different combinations of said holes. For the explanation of the terms "single-positional holes" and "plural-positional holes" it must be remembered that in known hole combinational systems predetermined hole positions are provided for the holes to be punched, each hole occupying however, only a single hole position so that such a hole may be designated as a "single-positional hole" and it will be seen that the known hole combination systems are using only single positional holes. With the present invention, however, records such as perforated record cards or perforated record strips are used which include single-positional holes and combinations of said holes, and which include also plural-positional holes and combinations of such holes with single-positional holes. As "plural-positional holes" I designate such holes which occupy a plurality of hole positions, each hole position being determined for a single-positional hole; a plural-positional hole may be provided for instance in the form of a double-positional hole occupying two adjacent hole positions. The plural-positional holes are preferably provided in the form of elongated holes (slots) while the single-positional holes are preferably provided in the known manner as circular holes. The application of hole combinations of the before mentioned kind permits a considerable saving of paper material since for the representation of the same number of distinct controlling characters less hole positions are required than has been necessary heretofore. For the representation of the ten numerical characters a theoretical minimum of four hole positions was necessary heretofore and for the distinct representation of the thirty-six letter and numerical characters by the single-positional hole system at least six hole positions are required. However, according to the present invention in the first instance only three and in the latter instance only five hole positions are necessary.

Accordingly, by means of the present invention controlling of machinery may be effected by hole combinations having single-positional as well as plural-positional holes and different combinations of said holes, and for that purpose the invention provides means preferably in the form of translating means for use of the novel perforating system.

The invention permits also analysis of the novel hole combinations while they are in uninterrupted motion past the analyzing means whereby a higher operating speed is obtained. The control of the translator is effected under the influence of a perforation in each hole position and provision is also made to determine whether there exists a connection between several hole positions, i. e. whether the same are occupied by a plural-positional hole or not, and in the first instance the translator will receive an additional controlling impulse so that a different resultant action exercised by the translator will be obtained than if the same had received controlling impulses from single-positional holes only.

It is therefore one of the main objects of the present invention to provide means for exploiting single-positional and plural-positional combinational holes.

Another object of the invention is to provide means for exploiting hole combinations provided in less hole positions than the minimum number of hole positions required heretofore.

Still another object is to effect at least ten different controlling actions by means of hole combinations arranged in only three hole positions.

Still a further object is to effect at least twenty-six different controlling actions by means of hole combinations arranged within only four hole positions.

Still another object of the invention is to effect at least thirty-six different controlling actions by means of hole combinations arranged within only five hole positions.

A further object is to provide electrical means for analyzing and translating single-positional as well as plural-positional holes.

A further object is to provide means responsive to perforations in predetermined hole positions occupying said positions as well as to the rib therebetween.

Still a further object of the invention is to provide a translator mechanism adapted to be controlled by more controlling impulses than there are controlling hole positions.

Other objects and advantages of the invention will become obvious from the following specification and the annexed claim.

In the drawings:

Fig. 1 shows the circuit diagram of a printing tabulating machine in connection with the registering mechanism corresponding to a single record column.

Fig. 2 shows the translator according to the present invention; the translator is used in connection with the tabulating machine shown in Fig. 1.

Fig. 2a shows the mechanical part of the translator unit diagrammatically shown in Fig. 2.

Fig. 3 shows the scheme according to which the hole combinations are provided in the records controlling the translator according to the present invention.

Fig. 4 shows a perforated record card punched according the scheme in Fig. 3 with numerical data for the control of the tabulating machine in Fig. 1.

Fig. 5 shows the perforation key for the representation of letters and numerals.

Fig. 6 shows a translator adapted to translate different hole combinational characters shown in Fig. 5 in different single controlling actions.

Fig. 7 shows a perforated record card for the control of the translator shown in Fig. 6 which may be provided in a printing tabulating machine adapted to print numerals as well as letters.

Fig. 8 shows a type bar which may be used for instance in a tabulating machine controlled by means of the translator shown in Fig. 6.

Fig. 9 shows a type wheel as used for instance in telegraph apparatus which is adapted to print under the control of hole combinations by means of the translator shown in Fig. 6 upon a continuous record strip.

Fig. 1 shows the well known diagram of an electrical tabulating machine for hole combinations, said hole combinations being translated by a translator mechanism into single impulses. The cards 11 are fed from a stack of cards downwardly one by one by means of a feed knife, and are then fed by feed rollers 12 between the contact plate 13 and the analyzing brush 14, one brush being provided for each record column. In the drawings only a single analyzing brush 14 is illustrated and the translator mechanism which is coordinated to said brush is shown in the form of a casing; the same means must, of course, be provided for each record column. Operation of the machine is started by closure of start contact 16, thereby establishing a current circuit over the tabulator motor 15 and relay 17. By energization of motor relay 17 a stick circuit for the tabulator motor 15 will be established over the armature of relay 17 and cam contacts 18, the latter being closed after the motor has started for operation. The cards are fed by the feed knife and the feed rollers 12 downwardly and close the card contact 22. The well known cam contacts 19 serve to establish a current circuit to the card contact 22 and control the energization of the relays 20 and 21. The contacts 19 close while the card passes under the brushes and therefore the relays 20, 21 may only be energized during the same time, and by means of the armature of relay 21 the contact plate 13 is connected only during said period to the contacts 19, but only as long as the subsequent cards keep the contact 22 closed. The contact 20' controlled by relay 20 as well as contact 18 will therefore open once during each machine cycle, however, not simultaneously but with a certain time difference so that the current circuit of the motor 15 will normally be maintained over one of both contacts. However, if the last card has passed at 22, the relays 20 and 21 will not be energized due to the contact 22 now remaining open and the contact 20' of the relay 20 will then also be open when contact 18 is open so that the motor circuit is interrupted and the machine is stopped. Each analyzing brush 14 is connected to a translator mechanism or unit according to the present invention. This part of the machine will still be explained more in detail in connection with Fig. 2. Each translator unit has a control magnet 42 coordinated thereto which, in accordance with the meaning of an analyzed hole combination, releases time differential current impulses within the machine cycle. The registering mechanism may take various forms; in Fig. 1 it has been assumed that the registering mechanism comprises for each record column a control bar 44 having a ratchet frame 45 as well as a set of type 46. During each machine cycle all control bars 44 are raised once by a reciprocating frame 71 and according to the meaning of the analyzed hole combination, the magnet 42 will be energized at different times thereby releasing the latched pawl 47 which will engage the teeth 48 of the control bar 44, thereby stopping the same in its upward movement. At the end of each analyzing cycle the type being in printing position is impelled by the type hammer 49 towards the printing platen roller 50, and before the downward movement of the various control bars 44 takes place the accumulator wheels 51 being pivotally mounted upon a frame and having been disengaged from the ratchet frames 45, are rocked in engagement with the latter; consequently, upon the restoring movement of the control bar 44 (said movement taking place at the end of the machine cycle) the printed amount corresponding, of course, to the meaning of the hole combination, will be entered into the accumulator wheel 51. Provision has been made that about during the first fourth of the operating cycle analysis of the hole combinational field and translation of the analyzed hole combinations into single impulses is effected; during the remaining three fourths of the operating cycle during which the type bars 44 move synchronously with an arm analyzing a commutator of the translator, the control of the registering mechanism in accordance with the adjustment of the translator is effected; during the last mentioned period the type bars are arrested in a moment corresponding to the meaning of the analyzed hole combinations so that the amounts corresponding to the hole combinations in the various record columns will be printed and accumulated.

A translator mechanism adapted to be used in connection with the machine shown in Fig. 1 is illustrated more in detail in Figs. 2 and 2a, Fig.

2a representing only a mechanical means of the translator unit shown diagrammatically in Fig. 2.

For the analysis and translation of the hole combinations there is provided for each record column an analyzing brush 14 as well as a translator unit which includes four translator magnets 60. Three of said magnets are designated by Roman numerals I—III in accordance with the three hole positions within which a hole combination may be represented as is clearly shown in Fig. 3; in addition thereto, a further magnet is provided designated 60—X which is controlled in dependence upon the existence of a plural positional hole within a record column as will still be described. Each analyzing brush coacts under the control of the card holes in a known manner with the contact plate 13 which receives current from the right hand side 24 (see Fig. 1) of the main line. Each of the four translator magnets 60 (Figs. 2 and 2a) controls a coordinated controlling bar 83 having at its upper end a plate 84 forming the armature of the magnet 60 and resting upon a shoulder of a lever 85 which is normally drawn by a spring 86 to the left against the plate 84. If the magnet 60 is instantaneously energized, the plate 84 and consequently the control bar 83 will be drawn upwardly and the spring 86 of the corresponding lever 85 will draw the latter to the left until a pin 88 fastened on said lever engages a nose 89 of a shift bar 90; accordingly, after deenergization of the magnet, the plate 84 will rest upon the upper edge of its lever 85 so that the shift contacts 91 still to be described which are connected to the bars 83 will remain in the shifted position. At the end of the operating cycle the magnet 35 will be energized due to the instantaneous closure of the contact 33. The magnet 35 will then draw the shift bar 90 to the right so that the levers 85 will be rocked by means of the nose of the shift bar in clockwise direction and all upwardly drawn armature plates will drop under the influence of the springs 87 into the lower position shown in the drawings. The shift bars 83 are provided with shift contacts 91 which select, depending upon the adjustment of the bars 83 in different combinations, a single live line corresponding to the meaning of the analyzed hole combination, the circuit leading then from the line 80 to one of the ten lines 81. The lines 81 terminate in contacts 94 of a commutator generally indicated at 92. The commutator 92 is analyzed by a contact arm 93 which connects once in each machine cycle the contacts 94 one by one with the common contact strip 95. The strip 95 is connected over line 40 with the control magnet 42 coordinated to the respective record column and said magnet is then connected over line 41 (see also Fig. 1) to the other side of the current source. The rotation of the arm 93 takes place in the course of the whole machine cycle in such a way that the analysis of the contacts 94 begins as soon as the last hole position has passed under the brush 14 and as soon as raising of the bars 44, as previously described in connection with Fig. 1, is effected in synchronism with the analysis of the contacts 94; the control magnet 42 receives current from the line 81 selected by the translator so that in the previously described manner the accumulator and printing mechanism will be controlled accordingly. In each machine cycle only one of the lines 81 will receive current, according to the energization of the magnets 60 in different combinations so that always only a single controlling impulse will be released. It will therefore be seen that depending upon the energization of the magnets 60 which has been effected in time differential combinations under the control of the brush 14, different controlling actions will take place.

The control of the four translator magnets 60 by means of hole combinations as shown in Figs. 3 and 4 in which each character requires only three hole positions, is effected in the following manner: The analyzing brush 14 is connected over line 27 (Fig. 2) with the contact strip 28 of a commutator comprising three contact pieces 30 and a contact arm 37 rotating once during each machine cycle. The arm 37 moves synchronously with the passage of the lower three hole positions of a card according to Fig. 4 past the contacts 30 so that in case one or more of the said three positions are perforated, a current circuit will be established through the perforation from the plate 13 over brush 14, line 27, contact strip 28 and arm 37 to the respective contact 30 on which the arm 37 passes in this moment, and from the contact 30 to the corresponding connecting line. The contacts 30 are connected by lines 61, 62, 63 with the translator magnets 60—I, 60—II and 60—III which are in turn connected to a common back line 52. From the line 61 branches a line 66 leading to the lower plate of a plate spring contact 53 (see also Fig. 2a) while the upper plate of said contact is connected to the line 29 thereby connecting the same with the contact strip 28. To the line 62 leading to the magnet 60—II is a branch line 67 leading on the one hand to a contact 54 and on the other hand to a contact 55; the upper plate of the contact 54 is connected to a line 70 leading to the auxiliary magnet 60—X while the upper plate of the contact 55 is connected to the previously mentioned line 29. From the line 63 branches a line 69 leading to the lower plate of a plate spring contact 57 which is on the other hand connected by a line 68 with the lower plate of the plate spring contact 56 being under the control of the magnet 60—II; the upper plate of the contact 56 is connected to the line 70. To the magnets 60—I, 60—II and 60—III are pivotally mounted arms 39 which serve for the control of the contacts 53, 54, 55, 56 and 57. These arms are held in the position shown in Figs. 2 and 2a under the influence of springs coordinated thereto; if, however, a magnet becomes energized, its arm 39 will be drawn downwardly and will close the contact coordinated to the respective magnet.

I will now describe how under the control of only three hole positions the control of four translator magnets 60 in different combinations can be effected. If the lowermost hole position I (see Fig. 3) of my record column is perforated, the magnet 60—I will be energized over line 61 (Fig. 2) and will raise its armature 84 which will then remain locked in the previously described way during the machine cycle; simultaneously with the energization of magnet 60—I its arm 39 will be moved downwardly and thereby the contacts 53 and 54 will be closed. Upon closure of contact 53 the magnet 60—I receives not only current from line 61 but also from the contact strip 28 over line 29, contact 53 and line 66. The branch current over 28, 29, 53, 66 unites with the current over 61 but has no further effect upon the translator mechanism. Due to the closure of contact 54, the magnet 60—X will be connected through line 70 to the line 67. The line 67 is on the one hand connected to the contact 55. However, at the moment in which the lowermost I-position passes under the brush, the contact 55 is open since the magnet 60—II is not energized. On the other hand, the line 67 is connected to the line 62 which in this moment is open at the contact 30; consequently, the magnet 60—X can receive no current impulse over the closed contact 54. If now the card passes further downwardly, the magnet 60—I will become deenergized since the arm 37 leaves the contact piece 30 of the line 61. The magnet will receive no current over line 29 since through the rib between the holes of two subsequent hole positions the current supply over brush 14 has been interrupted. If the arm 37 has reached the contact 30 of the line 62 and if there is a hole in the II-position, the magnet 60—II will be energized over the line 62, and the current will return in the previously described way over the common line 52 of all magnets 60. Through the energization of the magnet 60—II, its control bar 83 will be attracted and will be held in the locked position. Simultaneously with the energization of the magnet 60—II, however, the contacts 55 and 56 will be closed through the coordinated arm 39. The magnet 60—II can now receive over the contact 55 and line 67 again a branch current from the line 29, said current uniting with the current coming from the line 62 but having no further effect upon the translator mechanism. However, the line 67 which is now in connection with the brush 14, is open at 54 since the magnet 60—I has been deenergized even if there was a single-positional hole in the I-position; the magnet would only be energized if a plural-positional hole were present to which case will be referred later. Due to the closure of contact 56 upon energization of magnet 60—II, the line 70 will be connected to the line 68, this connection being however of no influence since on the one hand the contact 54 is open and on the other hand also the contact 57 connected to the line 68 is open because upon analysis of the II-position the magnet 60—III cannot have been energized. If now the arm 37 moves further, the magnet 60—II will become deenergized supposing there was a single-positional hole in the II-position; said deenergization is effected on the one hand by the arm 37 which leaves the line 62 and on the other hand by the fact that the hole in the II-position leaves the brush 14 thereby insulating the same from the line and interrupting also the circuit over line 29, contact 55 and line 67 which could form a stick circuit for the magnet 60—II. If the III-position is in analyzing position, the arm 37 will connect the strip 28 with the line 63 and consequently the magnet 60—III will be energized if there is a single positional hole in said position and the coordinated control bar 83 will be adjusted. Simultaneously with the energization of the magnet 60—III, the contact 57 will be closed so that the line 63 will be also connected to the line 68 which on the other hand is now open at the contact 56 since the magnet 60—II has already been deenergized. Accordingly closure of contact 57 will be of no influence in this instance.

From the foregoing specification will be seen that the magnets 60—I, 60—II and 60—III are energized in exactly the same manner as determined by the single-positional holes of the positions I, II and III and that consequently thereof, also the control bars 83 will be adjusted accordingly. The energization of the magnets 60—I, 60—II and 60—III is now effected independently of the fact whether the perforation of a position forms a single-positional hole or whether said perforation forms part of a plural-positional hole. Since, however, according to the present invention a different controlling effect must be caused depending upon the fact whether adjacent hole positions are occupied by single holes or whether they are occupied by a single plural-positional hole occupying the same hole positions, provision must be made to determine if between several positions there is a connection in the form of a plural-positional hole. This fact is indicated by the magnet 60—X which is controlled in a manner still to be described. This magnet will be energized each time there occurs a plural-positional hole in a controlling character. The mechanism still to be described will determine if holes in the positions I and II (Fig. 3) are connected, i. e. if the same form a plural-positional hole, or if there is a plural-positional hole in the positions II and III, and in each of both cases the magnet 60—X will be energized. It will be clearly seen from the previous specification that the magnets 60—I, 60—II and 60—III are energized each time if there is a hole on the respective position, independently thereof whether the same forms a single-positional hole or part of a plural-positional hole. If it is now assumed that the positions I and II are occupied by a plural-positional hole, the following controlling operations will be effected differing from those mentioned in the previous specification in which only single-positional holes have been considered: If the arm 37 has left the line 61 after the passage of the I-position under the brush 14, the current circuit of the magnet 60—I over this line will have been interrupted; since, however, the connection between the plate 13 and brush 14 will not have been interrupted due to the elongated hole passing at this moment under the brush, the magnet 60—I will further receive current over the previously established stick circuit 29, contact 53 and line 66 and consequently this magnet will remain energized and will still be energized if the II-position has passed under the brush 14 in which case the arm 37 connects the contact strip 28 with the line 62. Since it has now been assumed that in the I and II position there is an elongated hole, in the moment II a current impulse will flow over line 62 through the magnet 60—II. At the same time, however, the magnet 60—I is still energized and accordingly the contact 54 is closed so that a current flows not only from the line 62 through the magnet 60—II, but also over the contact 54 and line 70 through the magnet 60—X back to the common line 52 of all magnets. If then the card passes further down beneath the brush 14, the magnets 60—I and 60—II will become simultaneously deenergized since in any case there will be between the II and III position a rib in the record column. It will therefore be seen that in case the I and II-positions are occupied only by single-positional holes the magnets 60—I and 60—II will only be energized, whereas in case these positions are occupied by an elongated hole the magnet 60—X will be energized in addition to the magnets 60—I and 60—II. Similar operations will take place if there is an elongated hole in the positions II and III. In this case, after the arm 37 has left the line 62 after the passage of a hole in the position II under the brush 14, a stick circuit will have been established from the brush 14 over contact strip 28, line 29, contact 55, line 67 through the magnet 60—II, said stick circuit holding also the contact 56 closed. In this case no current will flow over the contact 54 since there can be only an elongated hole either in the I and II position or in the II and III position. If then after the passage of a hole of the III-position under the brush, the arm 37 connects the line 27 with the line 63, the magnet 60—III will be energized and will close its contact 57. Consequently, also a current can flow from line 63 over line 69, contact 57, line 68 and the closed contact 56 (which, due to the elongated hole, is held closed by the magnet 60—II which remains energized) to the line 70 and through the magnet 60—X so that this magnet will again be energized. It will also be seen that in this instance, with single holes in the II and III-positions, only the magnets 60—II and 60—III will be energized while in the presence of an elongated hole on these positions the magnet 60—X will be energized.

The arrangement of the shift contacts 91 and of the lines 81 is made in the generally known manner (see for instance U. S. Patent 1,664,539) in such a way that depending upon the adjustment of the control bars 83 in different combinations only a single connection between the line 80 and one of the lines 81 will be selected. If the shift bars 83 of those positions are raised on which according to the scheme of Fig. 3 there is a hole and if in addition thereto the bar 83 of the magnet 60—X is raised in the case the respective perforated character includes an elongated hole, a line will be selected corresponding to the meaning of the respective hole combination.

In the preceding specification has been described how under the control of hole combinations ten different controlling actions are obtained which may be used for instance for the control of a printing accounting machine or, as in the described embodiment, for the control of a tabulating machine. However, the invention is by no means limited to ten controlling actions but, according to the particular requirements, it may be applied in connection with any number of different hole combinations; so for instance Fig. 5 shows the perforation scheme according to which the numerical as well as the alphabetical characters are distinctly represented by hole combinations, the numerals occupying in accordance with Fig. 3 only three hole positions and the letters occupying only five hole positions. Fig. 6 shows a translator which serves in a manner similar to the translator in Fig. 2 for the control of a printing tabulating machine. In the embodiment according to Fig. 6, however, it is assumed that only printing of numbers and numerical data is effected since the letter data must not be added. Provision will therefore have to be made in such a way that for instance for record fields in which only numerals occur a translator and a mechanical device are used as shown in Figs. 1 and 2 while for record columns in which only letters and numerical data occur which need not be added such as the name and account number of a person, only type bars are provided having numeral and letter type. A record card 11 adapted to control a translator according to Fig. 6, is shown in Fig. 7; said card contains the name and address of a person to which the numerical data represented in the fields a, b, c and d refer. The name of the person is punched in the left rectangular record field in the lower part of the card while the numerical data are represented by perforations in the adjacent fields a, b, c and d.

The translator shown in Fig. 6 may be controlled in accordance with the scheme of Fig. 5 by five hole positions. The three lower hole positions I, II and III are exactly identical with the previously described hole positions according to Fig. 3 and the control of the translator magnets 60—I, 60—II and 60—III as well as the control of the auxiliary magnet 60—X is effected in exactly the same manner as has been previously described so that no further reference thereto is necessary particularly in view of the fact that in Fig. 6 the same reference numerals as in Fig. 2 have been used, and accordingly the foregoing specification refers equally well to Fig. 6. The analysis of the positions IV and V is effected in a manner similar to the analysis of the positions I, II and III; the arm 37 connects in the moment in which these positions pass under the brush 14, the lines 64 and 65 respectively with the contact strip 28. In addition to the magnets coordinated to the lower three positions there are, of course, also provided translator magnets 60—IV and 60—V for the upper positions IV and V; these magnets are adapted to be energized over their coordinated lines 64' and 65 respectively if there is a hole on the respective position in the column. The magnets 60—IV and 60—V have shift bars 83 coordinated thereto in a similar way as is the case with the remaining magnets; there is a further magnet 60—Y (to which there is also a shift bar 83 with shift contacts coordinated) provided controlled in dependence upon the magnets 60—IV and 60—V. Through the different adjustment of the bars 83 by the magnets 60—I to 60—V and one of the magnets 60—X or 60—Y only a single connection will be selected between the line 80 and one of the thirty-six lines 81, the latter corresponding to the ten numerical characters and to the twenty-six letter characters; as may be seen from Fig. 5 there occurs in each controlling character only a single elongated hole so that in each operating cycle, if at all, only one of the magnets 60—X or 60—Y will be energized. The magnet 60—IV has two contacts 73 and 74 coordinated thereto which are closed by an arm 39 as long as the magnet remains energized. The upper plate of the plate spring contact 73 is connected to the line 29 while the lower spring is in connection with the line 64 leading to a contact piece 30'. The lower plate of the contact 74 is connected over line 75 to line 65 and the upper plate of said contact is over a line 72 in connection with the magnet 60—Y, the back line of the same being connected to the common back line 52 of all translator magnets. The energization of the magnets 60—I, 60—II, 60—III and 60—X upon the passage of the lower three hole positions I and II and III is effected in the previously described way. If the position IV passes under the brush 14 and if this position is perforated, the magnet 60—IV will be energized and will draw its armature 83 upwardly which is then locked in the upper position. Simultaneously with the energization of the magnet 60—IV, the contacts 73 and 74 will be closed. Due to the closure of contact 73 the magnet 60—IV will again receive a branch current over line 29 which, however, will again be interrupted after the IV-position has left the brush 14 in case there was only a single-positional hole on this position. Through the closure of contact 74 the line 65 is connected to the line 72. Since, however, the line 65 is open at its contact piece 30', no current impulse can be sent through the line 72 over the magnet 60—Y in the moment in which the IV-position passes under brush 14. It will also be seen that due to the closed contact 73 no back current can flow over line 29 or one of the contacts 53 or 55; these contacts are always open if the IV-position passes under the brush 14 (even in case all magnets 60—I, 60—II and 60—III have been energized) since according to the scheme in Fig. 5 there is no elongated hole at all provided, occupying the III- and IV-positions. If now the V-position comes under the brush 14 and if there is a hole on this position, the magnet 60—V will be energized over line 65 and will adjust its control bar 83 accordingly. Now, if the preceding IV-position was not punched at all or if only a single-positional hole was provided therein, the contact 74 will be open when the V-position is analyzed and no branch current can flow from the line 65 over line 75 since the contact 74 is open. If, however, on the IV and V-positions there is an elongated hole occupying both positions, the magnets 60—IV and 60—V will become energized as will be clearly seen. Due to the elongated hole, however, upon the passage of the card from the IV to the V-position under the brush, the electrical connection between the plate 13 and the brush 14 will not become interrupted so that the magnet 60—IV will still maintain its own stick circuit if the position V is already under the brush 14, said stick circuit leading over line 29, contact 73 and magnet 60—IV. Therefore, if the V-position comes under the brush 14 and the magnet 60—V is energized, a current impulse will also flow over the line being in connection with the line 65, over the contact 74 now being closed, the line 72 and through the magnet 60—Y so that this magnet will be energized and will adjust its control bar 83 accordingly.

Now I will briefly refer to the energization of the magnets 60 in accordance with the different perforations: Each of the magnets 60—I to 60—V will become energized if there is at all a hole in the respective positions. If the positions I and II or the positions II and III are occupied by an elongated hole, the auxiliary magnet 60-X will become energized in addition to the respective magnets 60 coordinated to the hole positions, and if the positions IV and V are occupied by an elongated hole, in addition to the magnets 60—IV and 60—V the auxiliary magnets 60—Y will become energized. Through the adjustment of the bars 83 in different combination only a single live line from the line 80 to one of the lines 81 will be selected as may be easily verified on the diagram of Fig. 5 and the illustration according to Fig. 6, and this verification will show that the lines 81 designated by numerals and letters correspond to the meaning of the hole combinations as shown in Fig. 5. All lines 81 lead to a commutator generally indicated at 100 to which they are connected one by one in accordance with their meaning in the sequence of the numerals 0 to 9 and the letters A to Z. The lines 81 are analyzed one by one by a contact arm 101 which rotates in the indicated direction once during each machine cycle and which connects thereby the selected line 81 with the contact strip 102 being connected over line 40 to a control magnet 42. Provision has been made that during a part of the operating cycle during which the arm 101 slides over the indicated insulated portion of the commutator 100, the analysis of the five hole positions is effected by means of the brush 14 so that the translator bars 83 are already adjusted and have already selected a line 81 when the arm 101 begins to analyze the terminal contacts of said lines. Depending upon the line 81 selected by the translator, the magnet 42 will then receive timed differential current impulses in a similar way as has been described in the preceding specification.

Fig. 8 shows a type bar having ten numeral and twenty-six letter type, said bar being adapted to be controlled by means of the translator shown in Fig. 6. Provision would then have to be made in a similar way as shown in Fig. 1 so that the type bars of all columns are raised synchronously with the analysis of the lines 81 and are arrested by means of the control magnets 42 and the stop pawls 47 at different times during their upward movement; accordingly depending upon the selection of one of the lines 81, the corresponding type will be adjusted in printing position and the meaning of said type will exactly correspond to the meaning of the previously analyzed hole combination.

Fig. 9 shows diagrammatically a type wheel as used for instance in telegraph apparatus and the like. The type wheel carries in the usual order ten numerical and twenty-six letter types and the wheel rotates synchronously with the analysis of the terminal contacts of the lines 81 by the arm 101 (Fig. 6); the control magnet 42 actuates the printing lever 102 which impels a paper strip 103 against the type wheel, a ribbon 104 being fed between the paper strip and the wheel. The magnet 42 is energized in the moment in which the arm 101 connects the selected line 81 (Fig. 6) over the magnet 42 with the right hand side 41 of the current source and in this moment also the type corresponding to the meaning of the selected line 81 will be in position opposite the printing cushion of the printing lever 102. If then the magnet 42 is energized the lever 102 will impel the record strip 103 against the rotating type wheel 105 and accordingly a print will be obtained upon the strip 103 corresponding exactly to the adjustment of the translator and to the meaning of the analyzed hole combination.

While I have shown and described a preferred embodiment of the invention, it will be understood that many changes, and omissions, and alterations, and substitutions in the mechanism and the manner of operation may be made by those skilled in the art without departing from the spirit of the invention.

What I claim is:

In a machine controlled by records having perforated characters in the form of single-positional holes and plural-positional holes and combinations thereof within a predetermined number of hole positions, sensing means, devices controlled thereby and responsive to perforated hole positions independently of their occupation by a single-positional or plural-positional hole, another device controlled by said devices when a perforation between adjacent hole positions, indicating a plural-positional hole, is detected, and means controlled by all of said devices for causing a single controlling impulse whose timing is representative of the perforated character.

MICHAEL MAUL.